United States Patent
Kobayashi et al.

(10) Patent No.: US 6,704,644 B1
(45) Date of Patent: Mar. 9, 2004

(54) CONSULTATION BUSINESS SUPPORT SYSTEM

(75) Inventors: Shusuke Kobayashi, Chigasakishi (JP); Masasuke Ishibashi, Suginami-ku (JP)

(73) Assignee: Aioi Insurance Co., Ltd., Tokyo (JP)

( * ) Notice: Subject to any disclaimer, the term of this patent is extended or adjusted under 35 U.S.C. 154(b) by 0 days.

(21) Appl. No.: 10/048,061

(22) PCT Filed: Jul. 27, 2000

(86) PCT No.: PCT/JP00/05025
§ 371 (c)(1),
(2), (4) Date: Jan. 28, 2002

(87) PCT Pub. No.: WO01/09784
PCT Pub. Date: Feb. 8, 2001

(30) Foreign Application Priority Data

Jul. 29, 1999 (JP) .......................................... 11-215680

(51) Int. Cl.[7] .............................................. G01C 21/00
(52) U.S. Cl. ...................................................... 701/200
(58) Field of Search ................................. 701/200, 207, 701/24, 117, 118, 204; 342/357.1, 357.09; 340/988

(56) References Cited

U.S. PATENT DOCUMENTS

| 5,835,907 A | 11/1998 | Newman ........................ 707/10 |
| 6,021,371 A * | 2/2000 | Fultz .............................. 701/200 |
| 2001/0001848 A1 * | 5/2001 | Oshizawa et al. ........... 701/210 |

FOREIGN PATENT DOCUMENTS

| JP | 11-175599 | 7/1999 |
| JP | 2000-205890 | 7/2000 |
| WO | 97/22940 | 6/1997 |

OTHER PUBLICATIONS

I.M. Press, vol. 18, Siebel Service Enterprise (SSV), Siebel Sales Enterprise (SSE), Oct. 25, 1997), p. 20.

Nikkei Jouhou Strategy, Mar. 1998, (Japan), Nikkei BP K.K. (Mar. 1, 1998), pp. 206–208.

Nikkei Jouhou Strategy, Apr. 1998, (Japan), Nikkei PB K.K. (Apr. 1, 1998), p. 150.

Nikkei Computer, Dec. 7, 1998 (Japan), Nikkei BP K.K., (Dec. 7, 1998) pp. 110–112.

* cited by examiner

*Primary Examiner*—Yonel Beaulieu
(74) *Attorney, Agent, or Firm*—Wenderoth, Lind & Ponack, L.L.P.

(57) ABSTRACT

A consultation business support system enables the expedition of administrative affairs of an insurance company by selecting optional information items and responding to a customer encountering a vehicular accident or trouble in accordance with the inquiry from the customer by referring to guiding procedure sequentially displayed on a display. Suitable optional items, so that the desired consultation service for resolving the problems can be swiftly and effectively fulfilled. When reception of a notice of the vehicular accident or trouble from the customer, the connected customer is verified by using a customer registration database, and the location of the vehicular accident or trouble is identified by using a digital map so as to search and appoint a suitable road service agent to deal with the vehicular accident or trouble affairs.

15 Claims, 23 Drawing Sheets

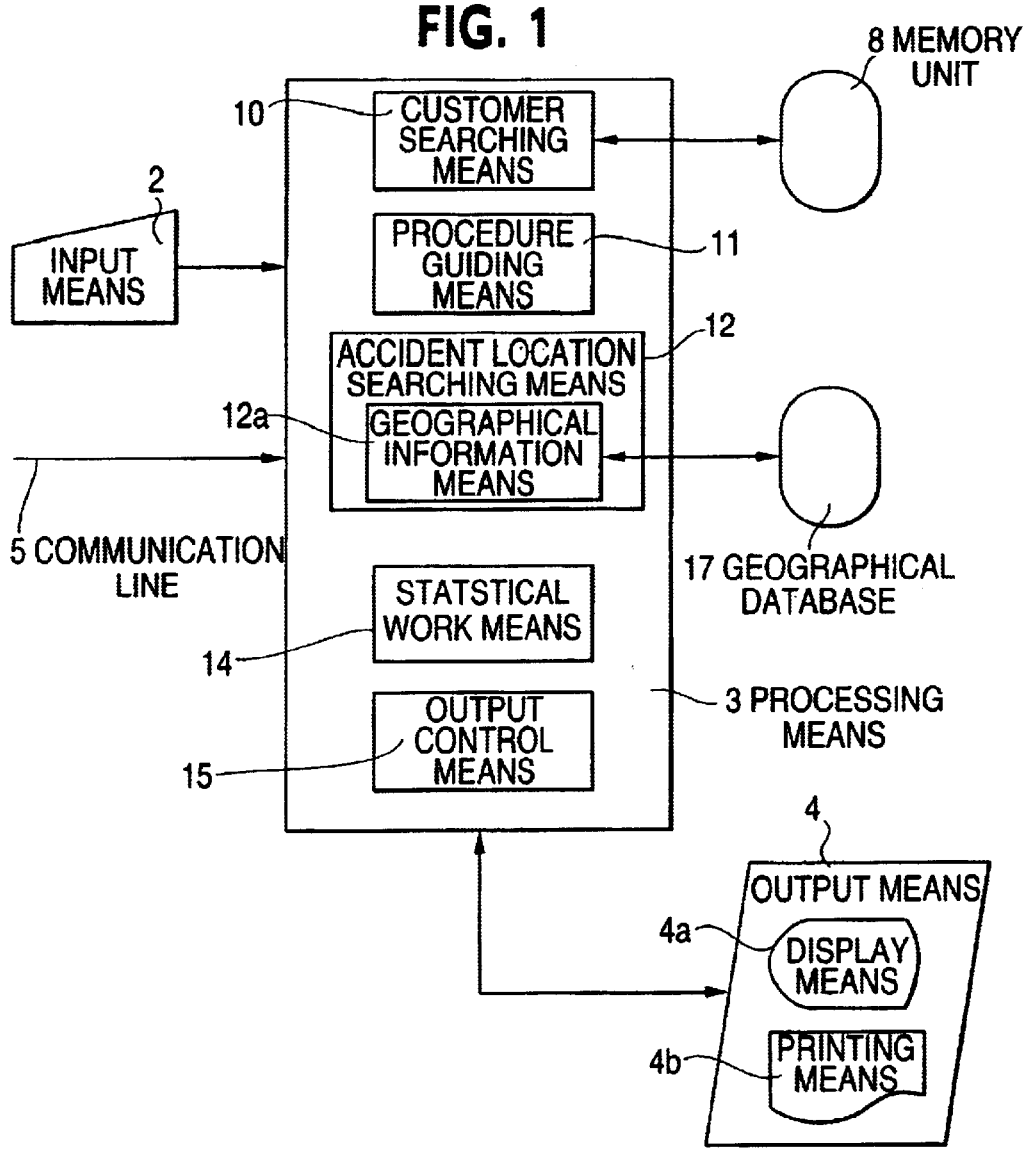

FIG.2

| Customer Data [F3] | Customer Details 1 [F4] | Customer Details 2 [F5] | History [F6] |

Reception No  Customer Name [XXX XXXX]    TEL [0x-xxxx-xxxx]
[9999]                   [XX XXX]          FAX [0x-xxxx-xxxx]
Insurance Company [xxxxxx] Insurance No [A123456789012]
Contract Term [1999/01/01] ~ [1999/05/08]
Address [xxxxx] [xxxx xxxxxxx xxxxxx
                 xxxxxxxxxxx]

Reception No    Customer Name [Suzuki Ichiro        ]
9999
Phone 0x-xxxx-xxxx              Fax 0x-xxxx-xxxx
[A123456789012]   Insurance Company [Dai-Tokyo      ] Insurance No
Contract Term [1999/01/01] - [1999/05/08]
Address [xxxxxxx] [xxxx-xxxx, Maracho 1- chome, Nara-shi, Nara-ken   ]

Customer Search [F2]

Provisional Reg.

Reception
Greeting/Message
Confirmation/ Selection

- Just After Incident
- Trouble
  - Accident Assist
  - Trouble Assist
  - Rush To Rescue
- Home Rescue
- Free Dial
- Dream Plan Insurance
  - Bicycle
  - Life
- Consultation
- Acceptance of Change in Item
- Acceptance of Corporate Party

{ 30

Hold [F9]    Result Input [F11]   Next Customer [F11]   Close [F12]
                                  1999/02/23  18:45:54   SPY

FIG. 3

| Customer Data [F3] | Customer Details 1 [F4] | Customer Details 2 [F5] | History [F6] |

Just After Incident
— Trouble —
Accident Assist
Trouble Assist

Rush To Rescue

Home Rescue

Free Dial
— Dream Plan Insurance —
Bicycle
Life
Consultation
Acceptance of Change in Item
Acceptance of Corporate Party Reception No. 9999 Customer Name [xxx xxxxxxxxxxx xxx]  TEL 0x-xxxx-xxxx
Japanese Kanji Character [                    ]  FAX [        ]
Insurance Company [xxxxxxxxxxxxx]  Service Start Date 1998/12/22
Insurance Number [12345678]         End Date       1999/12/22
Customer Address [xxxxxxx] [xxxx xxx xxxxx xxxxx xxxxxx xxxxxx]
Japanese Kanji Character [xxxxx xxx xxxxx xxxxx xxxxxx xxxxxx]

Urge the customer to call back after helping the injured and ensuring safety

Reception No   Customer Name [YKG Komatsu          ]
Phone 0x-xxxx-xxxx                        Fax  0x-xxxx-
   9999
   xxxx-
         Insurance Company [Dai-Tokyo        ]    Service: Start Date   98/12/22

Customer Search
[F2]

Provisional Reg.

Just After Incident
  ├ Affirmation of the injured
  ├ Affirmation of safety precaution
  └ Information of redialing

↙ 31

Hold [F9]   Call Back                Result Input [F11]  Next Customer [F11]   Close [F12]
                                        1999/03/01        22:22:47              SPV

FIG. 5

Customer Search

| Member Information | Use History |

Insurance Company Insured [xxx ▽]  Insurance Number (Member's ID) [      ]

Customer Phone Number [      ]  Reg. Number [   ]

Customer Name [      ]

Japanese Kanji Character [      ]   Zip Code [   ]   Search

| Insurance Company | Insurance Number (Member's ID) | Name (Kanji) | Name (Kana) | Phone | Address |
|---|---|---|---|---|---|
| XX Company | 12345678901234567890 | 123456789012 | 12345678901234567890 | 12345678901234567890123 | 1234567890123456789012345678901234567890123456 |

Settled    Tentative Registration    Back

FIG. 6

| Just After Incident |
|---|
| ─Trouble─ |
| Accident Assist |
| Trouble Assist |
| Rush To Rescue |
| |
| Home Rescue |
| |
| Free Dial |
| ─Dream Plan Insurance─ |
| Bicycle |
| Life |
| Consultation |
| Acceptance of Change in Item |
| Acceptance of Corporate Party |

[Customer Data [F3]] [Customer Details 1 [F4]] [Customer Details 2 [F5]] [History [F6]]

34

Reception No  Customer Name [xxx xxxx]   TEL [0x-xxxx-xxxx]
[9999]                    [xxxx]           FAX [0x-xxxx-xxxx]
Insurance Company [xxxxxx] Insurance No [A123456789012]
Contract Term [1999/01/01] - [1999/05/08]
Address [xxxxxxx] [xxxx xxx xxxxx xxxxxx
         xxxxxxxxxxx]

Reception No        Customer Name [Suzuki Ichiro      ]
 9999                                      Phone  0x-xxxx-xxxx
                                           Fax    0x-xxxx-xxxx
Insurance Company [Dai-Tokyo       ] Insurance No [A123456789012]
Contract Term [1999/01/01] - [1999/05/08]
Address [xxxxxxx] [xxxx-xxxx Naracho, 1-chome, Nara-shi, Nara-ken  ]

Customer Search [F2]

Provisional Reg.

Reception
 ─Greeting/Message
  Confirmation/Selection

| Hold [F9] | Disconnect |   | Result Input [F1] | Next Customer [F1] | Close [F12] |
|---|---|---|---|---|---|
|   |   |   | 1999/02/19 | 16:28:50 | SPV |

FIG. 8

| Just After Incident | Customer Data [F3] | Customer Details 1 [F4] | Customer Details 2 [F5] | History [F6] | | |
|---|---|---|---|---|---|---|
| Trouble | Reception No. | Customer Name [Suzuki Isao] | | | | |
| Accident Assist | | Japanese Kanji Character | | | | Customer Search [F2] |
| Trouble Assist | Insurance Company [xxxxxxxxxxxxx] | | | TEL 0XXX-XX-XXXX | | |
| Rush To Rescue | Insurance No. [0123456789] [XXXX XXXX] | | | FAX | | |
| | Address [xxxxxxx] | | Service | Start Date [1999/01/29] | | Provisional Reg. |
| Home Rescue | Japanese Kanji Character | | | Expiration Date [2000/01/28] | | |
| Free Dial | ○ Affirmation of three major burden | | | | | Accident Assist — 36 |
| Dream Plan Insurance | ○ Customer Search | | | | | 1. Customer Search |
| Bicycle | Reporting Manner | | Reporting Manner/ Verification of insurance policy | Approximate Expense / Manner of Payment | | 2. Report Manner 3. Check Contract |
| Life | ○ Post Report ○ On-Site Report (non-contact police) ○ On-Site Report (contacted police) | | | | | 4. Check Actual Status 5. Select |
| Consultation | Insurance Confirmation | | | | | Arrangement |
| Acceptance of Change in Item | Reporter [ ] Insurant-Reporter Relation [same] | | | | | 6. Select Wrecker 7. Estimate Fees |
| Acceptance of Corporate Party | Accural Date [1999/02/24] | | | | | 8. Payment Method |
| | Vehicle Registration Number [Chiba][100][SA][1798] [CNG] | | | | | 9. Arrangement |
| | Vehicle Type Name [Land Cruiser ] [HDJ81V] | | | | | Message Transfer |
| | [Van ] Purpose[ ] | | | | | |
| | Insurance Number [3752226655] Insurance Branch: Monthly Payment | | | | | |
| | Car Insurance | | | | | |
| | Type: SSAP | | | | | |
| | Duration of Insurance 1999/01/29-2000/01/29 Grade: [02] | | | | | |
| | Payment: Lump Sum Payment | | | | | |
| | Display Map | Event Transfer | | Next Page | SPW Transfer | |
| Hold [F9] | Call Back | | | Result Input [F11] | Next Customer [F11] | Close [F12] |
| | | | | 1999/03/01 | 18:30:46 | SPW |

FIG. 9

Status Confirmation | Approximate Expense/Payment Manner

Status Confirmation
Request Service
☐ Wrecker Ordered  ☐ Hotel Order  ☐ Alternate Transport Ordered  ☐ Car Transport Order Contact Information (Cell Phone) [ ]

Self-movable  ☐ Yes  ☐ No

Place of Accident
○ Customer Home  ○ Local Road  ○ Highway

Vehicle Class: Large car

JAF Member
Member's Card  ○ Carried  ○ None
 ○ Not Carried

Occupant Number [ ]

Current Position [ Map ▽ ] [ ]

Member's Home [ Map ▽ ] XXXXXXXXXX

Distance to Member's Home [ ] km

Map Link | Relief Free Dial | Previous Page | Next Page

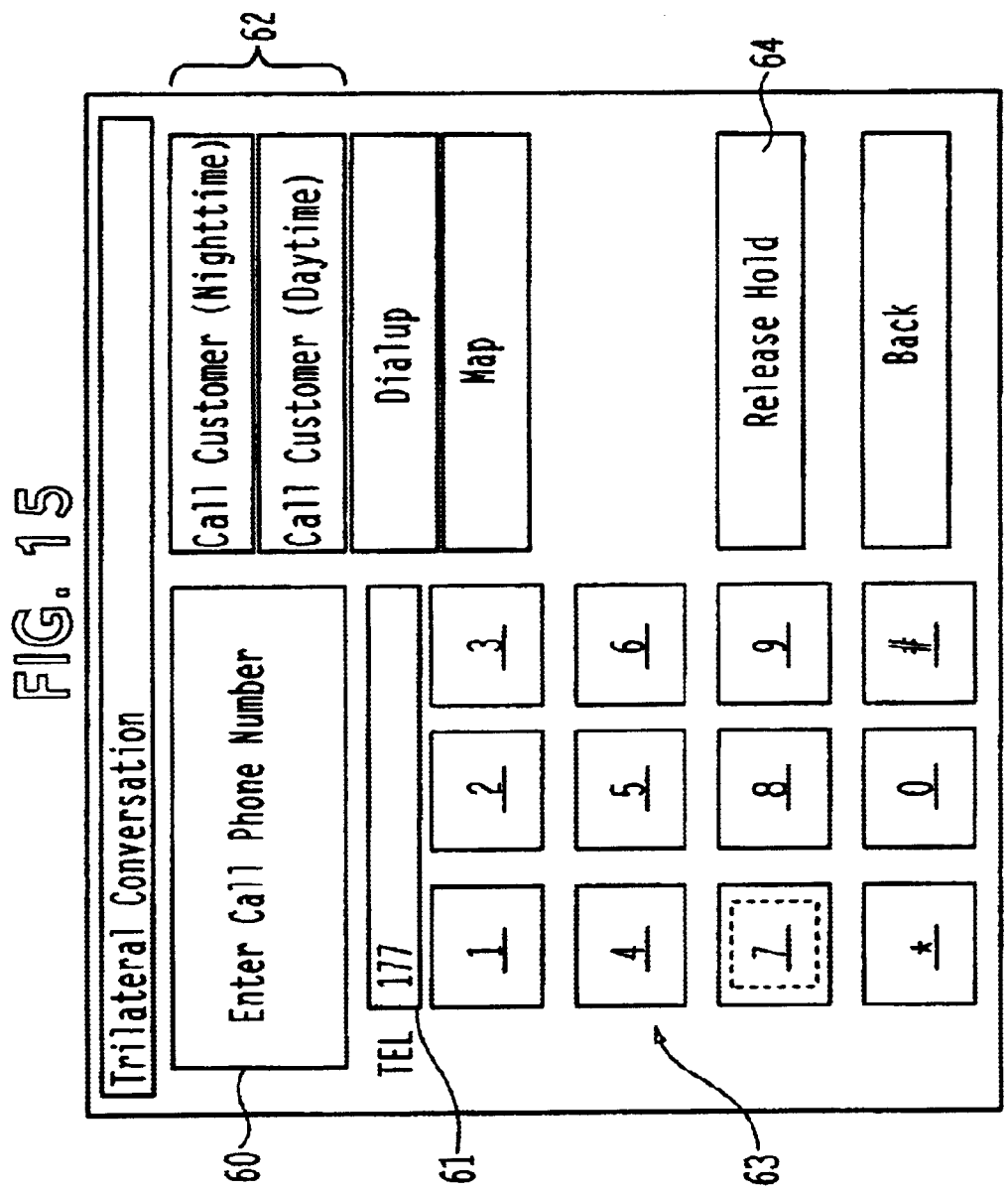

FIG. 16

Estimate Calculation / Payment Manner

Estimate Calculation / Payment Manner

| Expenses | | Deduction | |
|---|---|---|---|
| Basic Fee | ￥ | Basic Fee | ￥ |
| Travel Fee | ￥ | Travel Fee | ￥ |
| Tow Fee | ￥ | Tow Fee | ￥ |
| Basic Working Fee | ￥ | Basic Working Fee | ￥ |
| (for work within 30 min.) | | (for work within 30 min.) | |
| Service Charge | ￥ | Service Charge | ￥ |
| Total | ￥ | Deduction Total | ￥ |

Amounted Demanded ￥ 0

Excise Tax ￥ 9999999

￥ 9999999

Actual cost and expense involved in work completed within 30 minutes shall be borne by a customer.

[ Garage Destination ]     [ Wrecker Order ]     [ Wrecker Ordered ]

[ Map ]   [ Transfer to Other Section ]   [ Previous Page ]   [ SPV Transfer ]

FIG. 19

TO: Kitatama Automobiles
   Phone (Daytime): 042-396-0211
   Phone (Night):
   Fax:

ARRANGEMENT SHEET

The following request has been made today.
Thank you for your cooperation in advance.
   1. Customer Name              xxx xxx
   2. Customer Address           xxxxxx xxxxx xxxxx xxxx x-x-x
   3. Customer Insurance Number  123456789
   4. Customer Phone Number      0xx-xxx-xxxx
   5. Customer Reg. Number       xxxx/xxx/x/xxxx
   6. Contact Phone Number
   7. Matters Requested
   8. Circumstances at Accident Site Road Assist Sec., Relief Free Dial Corp.
   Tel:042-921-1211
   Fax:042-396-1231
Operator: No.6 Operator
Arranged: 9th March,1999 11:13

Dibs Relief Free Dial
Demand for Payment

Amount Contributed ¥  :
Designated for Transfer :
Budget Account        :
Account Holder's Name :

Reception Date        :

Designation for Transfer:

Disbursement Slip     :

Settled          Person Responsible   Responsible Official
                                        Procedure Completed:

FIG. 20

Attn:
Fax

---
Notice Sheet
---

We made the following arrangement.
1. Customer Name
2. Customer Address
3. Customer Insurance Number
4. Customer Phone Number
5. Matters Requested
6. Circumstances at Accident Site
7. Road Service Agent
   Phone (Daytime):
8. Garage Service
   Phone (Daytime):

---

Road Assist Sec., Relief Free Dial Corp.
   Tel: 042-921-1211
   Fax: 042-921-1231
Operator: No.6 Operator
Arranged: 9th March, 1999 11:13

FIG. 21

List of Affairs Handled    Fixed Period 1999/01/01-1999/01/02

Printed 22 Feb. 1999 (Mon.)
Page: 1/18/02

| Start Date/Time | Finish Date/Time | Reception No. | Operator | Talk Times | Post-Contact | Category | Details |
|---|---|---|---|---|---|---|---|
| 1999/01/01 09:45:20 | 1999/01/01 09:48:00 | 0001 | XX | 0180 | 03-3XXX-XXXX | | |
| 1999/01/01 09:45:20 | 1999/01/01 09:48:00 | 0001 | XX | 0180 | 03-3XXX-XXXX | | |
| 1999/01/01 09:50:31 | 1999/01/01 09:52:11 | 0002 | XX | XXXX | 03-3XXX-XXXX | | |
| 1999/01/01 09:50:35 | 1999/01/01 09:51:20 | 0003 | XX | XXXX | | | |
| 1999/01/01 09:50:35 | 1999/01/01 10:20:00 | 0004 | XX | XXXX | 03-3XXX-XXXX | | |
| 1999/01/01 09:55:35 | 1999/01/01 10:02:20 | 0005 | XX | XXXX | 03-3XXX-XXXX | | |

FIG. 22

| Service | Particulars | Number | Total |
|---|---|---|---|
| TOTAL RECEPTION | | Printed: xx/xx/1999 (Mon) | |
| Period 01 Jan. 1999-02 Jan. 1999 | | | Page 1/2 |
| Just After Accident/Trouble | | | 0 |
| Trouble/Accident Assist | | | 0 |
|     Wrecker | | 0 | |
|     Lodging expense | | 0 | |
|     Expense for coming back | | 0 | |
|     Transport after repair | | 0 | |
| Trouble/Accident Assist | | | 0 |
|     Wrecker | | | |
|     Lodging expense | | 0 | |
|     Expense for coming back | | 0 | |
|     Transport after repair | | 0 | |
| Dispatching to accident scene | | | 0 |
|     Physical injury | | 0 | |
|     Other trouble | | 0 | |
| Dispatching to home | | | 0 |
|     Fire disaster | | 0 | |
|     Water leakage/blockage | | 0 | |
|     Unlock door | | 0 | |
|     Emergency repair | | 0 | |
| Free consultation | | | 0 |
|     Legal problem | | 0 | |
|     Medical issue | | 0 | |
|     Car mechanic | | 0 | |
|     Travel | | 0 | |
|     Tax | | 0 | |
|     Housing finance | | 0 | |
| Dream/Bicycle | | | 0 |
|     Recycle(distressed)goods | | 0 | |
|     New car buying | | 0 | |
|     Used car buying | | 0 | |
|     Automobile inspection | | 0 | |
|     Rental/lease car | | 0 | |
|     Private car maintenance | | 0 | |
| Dream/Life | | | 0 |
|     Housing improvement | | 0 | |
|     Ceremonial functions | | 0 | |

FIG. 23

| | | | | | | | | | | | | | |
|---|---|---|---|---|---|---|---|---|---|---|---|---|---|

*Page content is a complex tabular figure (FIG. 23) showing a "List of Affairs Handled" for Fixed Period 1999/01/01-1999/01/02, printed 22 Feb. 1999 (Mon.), Page: 1/18/02.*

Columns: Cancel | Start Date/Time | Finish Date/Time | Reception Number | Operator | Affairs | Date of Accident | Category of Relief Agency | Code of Agency | Wrecker Garage Code | Agent Name Phone / Garage Name Phone | Payment Namer Row 1: ☐ | 1999/01/01 09:45:20 | 1999/01/01 09:40:00 | 01010001 | XX | | 1999/01/01 | Towaway NM | 0005 0001 | XXXXXX XXXXXX | 03-xxx-xxxx 03-xxx-xxxx | Authentication XXXXxx xx
- Customer Information: Name XXXX XXXX
- Insurance Data XXX
- Insurance No. 03-XXXX XXXX  0001 Registration No. XXXX  1999/01/01-1999/12/31  58  8  1236
- ① Credit Card Data  XXX  3540000001000  Credit Card Number 1021510  12,000  Authentication XXXXxx
- ② Credit Card Information  XXX  3540000001000  Credit Card Number 2500012  13,000  XXXXxx Row 2: ☐ | 1999/01/01 09:50:31 | 1999/01/01 09:52:11 | 01010002 | XX | | 1999/01/01 | Towaway NM | 0105 0002 | XXXXXXXX XXXXXXXXAAA | 045-xxx-xxxx 045-xxx-xxxx | Authentication XXXX XXXXxx
- Customer Information: Name 12345678901234567890123456789012345678901234567890
- Insurance Data 12345678901234567890  1999/01/01-1999/12/31
- Insurance No. 03-XXXX XXXX  Registration No. 1234567890234  123  12  12345
- ① Credit Card Data  XXX  3540000001000  Credit Card Number 2151518  999,999  Authentication XXXXxx
- ② Credit Card Information  XXX  3540000001000  Credit Card Number 1215101  999,999  XXXXxx Row 3: ☐ | 1999/01/01 09:50:35 | 1999/01/01 09:51:20 | 01010003 | XX | | 1999/01/01 | Towaway NM | 9001 | XXXXX | 03-xxx-xxxx | Authentication XXXX XX
- Customer Information: Name XXXX XXX
- Insurance Data XXXX
- Insurance No. 03-XXXX XXXX  0002 Registration No. XXXXXX  1999/01/01-1999/12/31  44  7  3221
- ① Credit Card Data
- ② Credit Card Information Row 4: ☐ | 1999/01/01 09:50:35 | 1999/01/01 09:5:20 | 01010004 | XX | | 1999/01/01 | Towaway NM | 0001 0001 | XXXXX XXXXX | 042-xxx-xxxx 042-xxx-xxxx | Authentication XXXX XX
- Customer Information: Name XXXX XXX
- Insurance Data XXX
- Insurance No. 03-XXXX XXXX  0003 Registration No. XXX  1999/01/01-1999/12/31  71  4  221
- ① Credit Card Data  XXX  3540000001000  Credit Card Number 2211000  14,200  Authentication XXXXxx
- ② Credit Card Information  XXX  3540000001000  Credit Card Number 1515000  15,000  XXXXxx Row 5: ☐ | 1999/01/01 09:55:35 | 1999/01/01 10:02:20 | 01010005 | XX | | 1999/01/01 | Towaway NM | 0002 0002 | XXXXXXX XXXXXXX | 03-xxx-xxxx 03-xxx-xxxx | Authentication XXXX XX
- Customer Information: Name XXX XXX
- Insurance Data XXX
- Insurance No. 03-XXXX XXXX  0004 Registration No. XXX  1999/01/01-1999/12/31  56  4  1511
- ① Credit Card Data  XXX  3540000001000  Credit Card Number 9651125  25,250  Authentication XXXXxx
- ② Credit Card Information  XXX  3540000001000  Credit Card Number 1500534  25,250  XXXXxx Row 6: ☐ | 1999/01/01 10:21:22 | 1999/01/01 10:30:21 | 01010006 | XX | | 1999/01/01 | Towaway NM | 9002 0521 | XXXXXXXXX XXXXX | 03-xxx-xxxx 062-xxx-xxxx | Authentication
- Customer Information: Name XXX XXX
- Insurance Data XXX
- Insurance No. 03-XXXX XXXX  0005 Registration No. XXX  1999/01/01-1999/12/31  56  4  3222
- ① Credit Card Data
- ② Credit Card Information

CONSULTATION BUSINESS SUPPORT SYSTEM

TECHNICAL FIELD

This invention relates to a system for supporting consultation business to handle inquiries from customers, and more specifically to a consultation business support system capable of quickly responding to inquiries from the customers to a customer center of a casualty insurance company as to a car accident, trouble or other problems.

BACKGROUND ART

Casualty insurance companies dealing with, for example, automobile insurance give advisory information to a customer or policyholder as to measures for acting on a car accident at once upon reception of a report of a traffic accident or the like from the customer during an insurance contract term. Similarly, the insurance companies offer the advisory information about appropriate measures for coping with automobile trouble on the road.

However, the consultation affairs known hitherto have been conducted as individuals by an operator or adviser who receives the incident report from the customer by telephone, referring to a management manual or other references. Therefore, the consulting system managed by the insurance advisers is required to be standardized uniformly.

In a case of inquiry from the policyholder, the insurance adviser first ascertains whether an inquirer is insured with the processing insurance company asking about the policyholder's name, number of insurance policy certificate, insurance company's name, and telephone number. Upon confirming that the inquirer is one of the policyholders of the processing insurance company, the insurance adviser gives the policyholder the relevant information in question. In furnishing the information with the policyholder in the case of a car accident, it is necessary to identify the type of a vehicle having the car accident or trouble, location of the car accident, contract basis with road service, number of occupants in the vehicle, state of notifying the police, and others and arrange to promptly move the vehicle running into trouble.

However, the conventional consultation system requires some time to identify the policyholder concerned and to make a search for an appropriate road service agent in the relevant area.

In such a case, an inexperienced adviser may not provide appropriate or formulary information for the policyholder's level of proficiency. The information offered by the inexperienced adviser may deviate from the standard information provided by the insurance company.

The consultation business includes a large variety of jobs including not only the providing of advisory information for the policyholder who informs the insurance company of a car accident on the road, but also handling of complaints and inquiries as to insurance contracts. Thus, an appropriate consulting system capable of handling various inquiries in a quick and efficient manner has been much awaited.

The present invention was made in the light of the problems as described above and has as an object to provide a consultation business support system capable of providing appropriate information in response to various inquiries from customers or policyholders in a quick and efficient manner.

DISCLOSURE OF INVENTION

According to the present invention, there is provided a consultation business support system for providing information in conformity with contents of inquiries from customers, which comprises means for selecting optional information items in accordance with the contents of inquiry from the customers, processing means for sequentially providing the information items selected respectively to the customer, processing means for sequentially providing the information items selected respectively to the customer item by item, selecting an agent for coping with an accident or trouble, and carrying on a tripartite conversation among an operator, the customer concerned and road service agent, and location searching means which is actuated in searching for the location at which a car trouble or accident, and serves to search out the road service agent or wrecker agent and calculate approximate time required for the road service agent or wrecker agent to arrive at the accident location.

According to the consultation business support system noted above, required consultation service can be fulfilled by sequentially providing the information items selected in accordance with the contents of the inquiries from the customers. Furthermore, the consultation service can be carried out swiftly since it enables the tripartite conversation.

The consultation business support system according to the invention may further include vehicle positioning means which is activated in identifying the current position at which a vehicle trouble or accident occurs to register the current position of the vehicle in question, in addition to the means for selecting optional information items in accordance with the contents of inquiries from the customers and the processing means for sequentially providing the information items selected respectively to the customers. The processing means has further functions of selecting an agent for coping with an accident or trouble, and carrying on a tripartite conversation among an operator, the customer concerned and road service agent. According to the vehicle positioning means, the customer involved in the car accident or trouble can be identified quickly, and appropriate advisory information can be given to the customer by use of the procedure guiding means. When providing the advisory information, the vehicle positioning means determines the current position of the vehicle in question, so that adequate directions for moving the vehicle can be provided for the customer concerned.

The aforementioned vehicle positioning means has functions of detecting the current position of a disabled vehicle, researching a garage destination to which the disabled vehicle is transported, and calculating the distance from the current position of the vehicle to the vehicle garage destination on the basis of geographical information of a digital map. Thus, advisory information about the directions for moving the vehicle and the vehicle garage destination can be promptly provided.

The consultation service standardized by the procedure guiding means may further comprise statistical work means for statistically processing the consultative matter with respect of each of statistics. With this statistical work means, issues raised by the customer when running into trouble can be statistically analyzed to take advantage of the result of the analysis after the fact.

Other objects and characteristics of this invention will be described hereinafter with reference to the accompanying drawings.

DESCRIPTION OF THE DRAWINGS

FIG. 1 is a block diagram showing the configuration of a consultation support system according to the present invention.

FIG. 2 is a diagram showing a screen image of inquiry requirements displayed during consulting service.

FIG. 3 is a diagram showing a screen image of guidance for dealing with an accident or trouble posed by a customer.

FIG. 5 is a diagram showing a screen image for carrying out the searching.

FIG. 6 is a diagram showing a screen image of customer information searched.

FIG. 8 is a diagram showing a confirmation screen image of an insurance policy certificate.

FIG. 9 is a diagram showing a confirmation screen image of the situation of the accident or trouble.

FIG. 15 is a diagram showing a screen image for confirming an arrangement of the vehicle garage destination.

FIG. 16 is a diagram showing a screen image for settling an expense account.

FIG. 19 is a diagram showing an order sheet for arranging the wrecker agent.

FIG. 20 is a diagram showing a communication sheet for recording the content of the consultation.

FIG. 21 shows a list of the job contents requested by the customer.

FIG. 22 is a diagram showing an aggregate tabulation of the actions committed by the customer.

FIG. 23 is a diagram showing a tabulation of the commission items processed by the consultation support system of the invention.

BEST MODE FOR CARRYING OUT THE INVENTION

Figure 4:
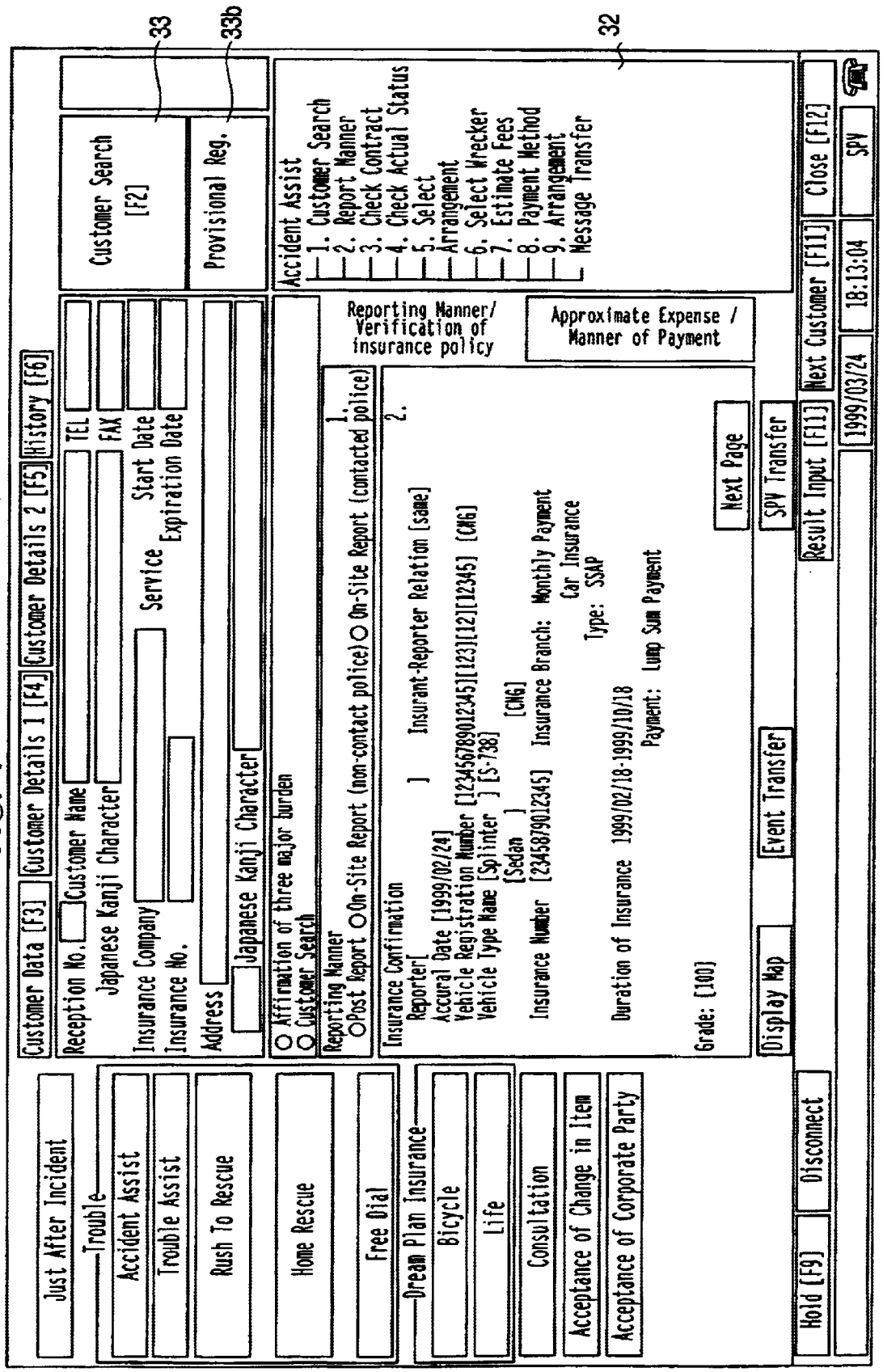
FIG. 4 is a diagram showing a screen image for searching the customer.

A mode for embodying the consultation business support system according to the present invention will be described hereinafter with reference to the accompanying drawings.

As shown in FIG. 1, the consultation business support system of the invention generally comprises an input means (input device) 2, processing means (processor) 3, and output means (output device) 4. The support system is installed in a consultation center of a casualty insurance company to assist in giving personal attention to insured persons or policyholders (customers) who take out automobile insurance.

There will be explained hereinbelow one example of consultation support service according to the invention in a case of dealing with a car accident on a road caused by a customer.

The input means 2 of the consultation business support system according to the invention is provided with a keyboard, mouse and/or other data inputting apparatus for entering and feeding various data to the processing means 3. The input means 2 further has a function of guiding advisory information given to the customer making contact with the consultation center of the casualty insurance company through a communication line 5 of a telephone or the like. The input means further comprises communication means for delivering a request message from the customer to a consulting operator who handles the consultation system in the insurance company. As one example of the communication means, there may be used a head set comprising a microphone and speaker for mutually communication between the customer and the operator.

The processing means 3 generally comprises customer searching means 10, procedure guiding means 11, accident location searching means 12, statistical work means 14, and output control means 15. The processing means 3 is formed of a general-purpose computer having a microprocessor for performing an arithmetical operation and memories such as ROM and RAM. With the processing means 3, a consultation business support program can be carried out to deal with an accident in the manner as described below.

The output means 4 may be composed of a display means 4a such as CRT and liquid crystal display, and printing means 4b such as a printer. On the display means 4a, there are displayed the current processing state of the support system, input contents inputted by the input means 1, and other data.

The customer searching means 10 is a program stored in the processing means 3 for searching and seeking the data of the customer accessed to the consultation center from a database DB stored in a memory unit 8. The contents to be searched include the name of the customer concerned, insured number of insurance policy certificate, registration number of the customer's vehicle, customer's telephone number, and other personal data. By inputting these customer's information data with the input means 2, whether or not the person now accessed to the consultation center is insured with the insurance company can be recognized in a moment of time.

At the time of identifying the customer, the system assumes its standby mode for standing ready to receive inquiries from the customer. All information data inputted thereafter from the input means 2 are recorded.

The procedure guiding means 11 serves to provide information for a guiding procedure to give advisory information from the operator to the customer. The guiding procedure in which the operator must provide the required advisory information to the customer is displayed in order of precedence in response to the inquiries (consulting contents about the accident) from the customer.

The accident location searching means 12 is activated for searching the location at which a car accident occurs according to the procedures indicated by the procedure guiding means 11. Based on the consulting contents, the address of the location of car accident is registered. At this time, geographical information for identifying the location of the car accident in concrete form can be obtained on a map with a geographical information means 12a.

The geographical information means 12a executes a program for displaying the geographical information so that a road map is displayed on the display means 4a using a digital map stored in a geographical database 17. The location of the car accident is automatically marked in a spot on the map displayed on the basis of the specified address of the location of the car accident.

The statistical work means 14 has functions of supervising the information data processed by the processing means 3 item by item, storing the information data in an adequate memory means, and allowing the information data item by item to be displayed on the display means 4a and/or printed out with the printing means 4b.

When operating the processing means 3, the output control means 15 is actuated to display an appropriate output form on the display means 4a in cooperation with other processing means. The prescribed output form is outputted from the printing means 4b in performing the statistical work.

Next, the operation of assisting the consultation service according to the aforementioned consultation business support system of the invention will be described.

The operator goes through the prescribed procedure for coping with the aftermath of the accident, while giving the customer the information data displayed sequentially on the display means 4a.

First, upon switching on the support system of the invention, the operator logs on with the customer's ID code and encrypted password to bring the support system into a standby mode. When the operator leaves the operator's seat, the support system assumes its irresponsive state so as not to receive access from the customers.

When the customer has access to the consultation center, the system acquaints the operator with the customer's access and displays a form for confirming the contents of inquiries from the customer as shown in FIG. 2. As shown, the relevant personal data of the customer are displayed.

Selection items 30 displayed on the left of the screen are divided according to the subject matter. In the illustrated case, the dialog box "Just After Incident" is selected in response to the customer's access immediately after the occurrence of the accident.

Consequently, an information screen image is displayed as shown in FIG. 3. At this time, measures for coping with the accident are indicated for giving advisory information items 31 to the customer concerned on the display with the procedure guiding means 11. The operator instructs the measures for coping with the accident to the customer while reading out the information items 31 from the display. Last, the operator calls on the customer to report the final outcome of the accident to the consultation center in return, and then, breaks the current connection with the customer.

When the operator again receives a call from the customer, "Accident Assist" is selected from the optional items 30 on the display to operate the customer searching means 10 with the procedure guiding means 11. Thus, the personal data of the customer concerned are searched on the searching screen as shown in FIG. 4.

At this time, itemized procedures 32 of the information guidance to be provided for the customer are displayed on the right side of the display. A dialog box "Customer Search" 33 is also displayed for searching and identifying the customer.

When selecting the dialog box "Customer Search" 33, a searching image form is displayed as shown in FIG. 5. With the customer searching, the customer concerned can be identified on the basis of some personal data including the name of insurance company insuring the customer concerned, the number of the insurance policy certificate, the telephone number, the registration number of the customer's car, and the customer's name. Also, the personal data of the customer concerned can be retrieved directly from the reception number issued when the customer contacted the consultation center at some previous time, consequently to quickly deal with the consultation once the customer has access to the consultation center.

FIG. 6 shows the screen image of the personal data of the customer searched out. By selecting the dialog item 34 on the display as illustrated, more detailed personal data as to the contractual coverage of the insurance with respect to the customer concerned can be displayed. In a case of the absence of the personal data of the customer concerned, the dialog box "Provisional Registry" 33b as shown in FIG. 4 may be selected for tentatively putting the customer concerned on record.

Figure 7:
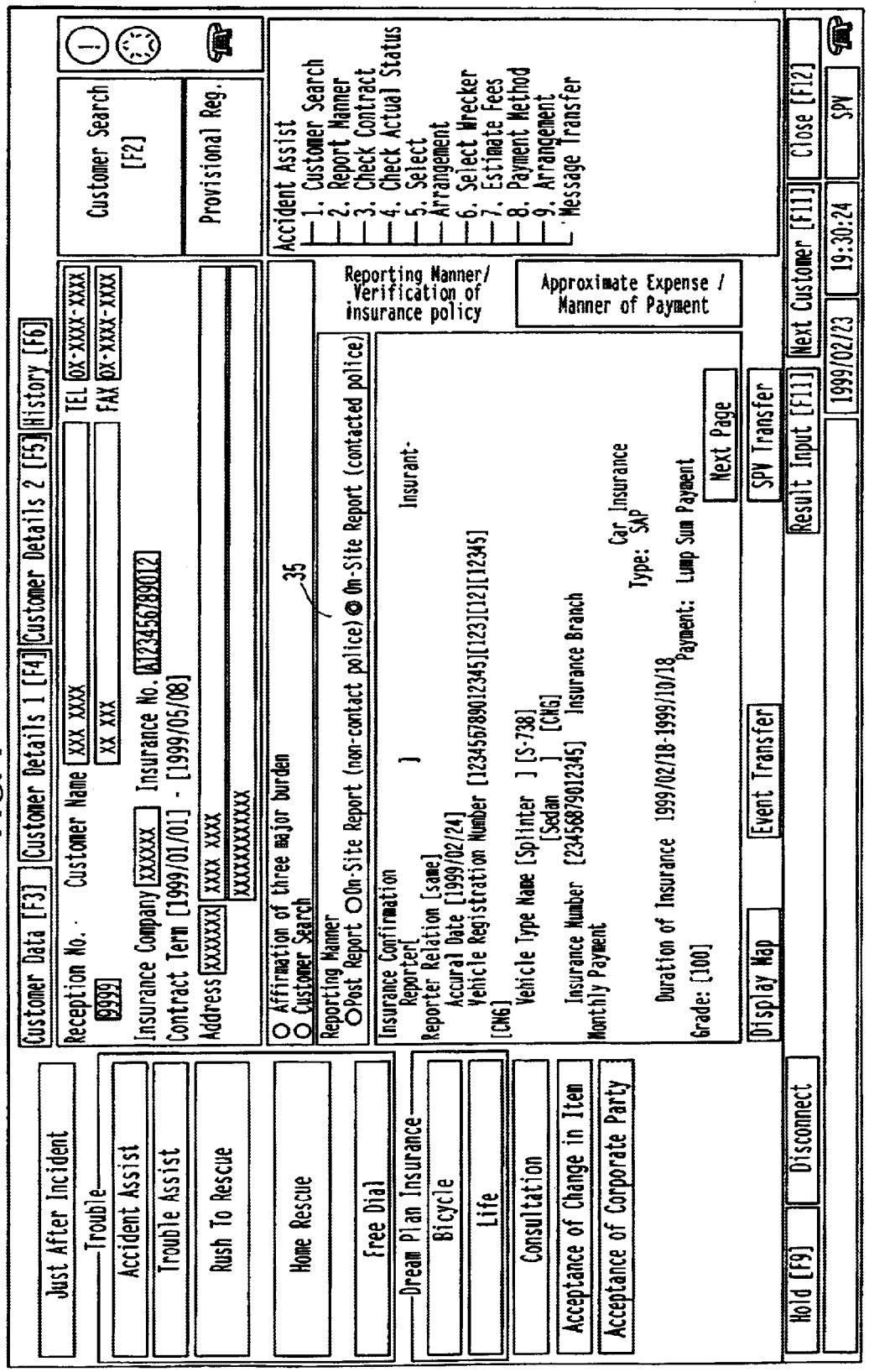
FIG. 7 is a diagram showing a screen image for selecting a report manner in which the customer notifies of an accident or trouble.

When confirming the personal data of the customer concerned, a screen image for running a reporting manner through the procedure guiding means 11 is indicated on the lower half of the screen of the display as shown in FIG. 7. Selection can be made from three items 35 of "Post Report", "On-site Report (non-contact police)", and "On-site Report (contacted police)" contained in the dialog box "Report Manner".

In a case of selecting "On-site Report" by way of example, the operator instructs the customer concerned to confirm whether or not a step of moving the car involved in the accident has been taken. Thereafter, the procedure for confirming the matters on the insurance policy certificate proceed. FIG. 8 shows a confirmation screen image for confirming the insurance policy certificate. As illustrated, entry contents 36 contained in the insurance policy as to the agreement for insurance for the customer concerned is displayed as illustrated.

After confirming the insurance policy, the confirmation screen image for the conditions illustrated in FIG. 9 is displayed with the procedure guiding means 11. Namely, there is displayed a confirmation screen image 40 containing the dialogs "Request Service", "Contact Phone", "Self-movable" condition of the vehicle in the accident, "Accident Place", "Road Service Member", "Occupant Number" in the vehicle, "Current Position" in the accident, "Customer Home Place", and "Distance to Home", meaning the distance from the location of the accident to the customer's home.

The dialog box "Request Service" in the confirmation screen image 40 contains "Wrecker Order", "Hotel Order", "Alternate Transport Order", and "Car Transport Order".

The dialog box "Accident Place" contains "Customer Home", "Local Road", and "Highway". When the dialog box "Current Place" is specified, the geographical information means 12a of the accident location searching means 12 is activated to search the position of the car in question on the map. Also in the dialog box "Customer Home Place", the address of the customer's home is searched out with the geographical information means 12a.

In the dialog box "Distance to Home", the distance from the location of the accident to the home of customer's own can be calculated.

Figure 10:
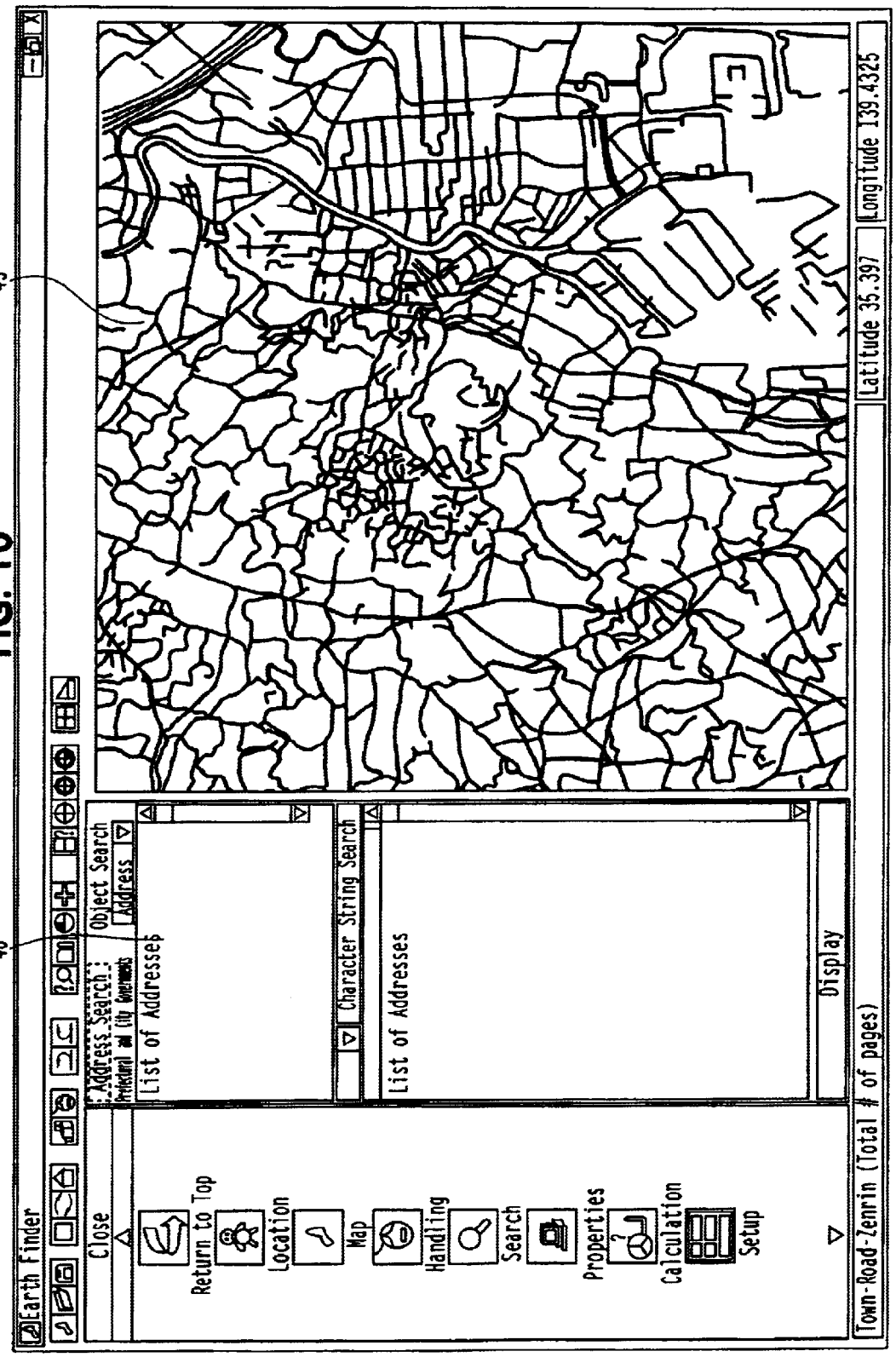
FIG. 10 is a diagram showing a map image displayed for searching the position of a vehicle.

The geographical information means 12a is activated by selecting "Current Place" to display the map searching screen image as shown in FIG. 10. In this screen image, a digital map 45 is displayed. Optional items 46 appear on the left side of the display.

When specifying one of the optional items 46, the location at which the vehicle in question is placed can be searched in the format of "Address Search" or "Object Search".

In searching in the format of "Address Search", one of the items in the dialog "Prefecture/City" or "Town Name" is specified to search out the accident location of the vehicle in question. As an alternative, the full address of the location at which the vehicle in question is located may be inputted. The location thus searched out is indicated on the map 45. The displayed image on the screen can be arbitrarily enlarged or reduced.

Figure 11:
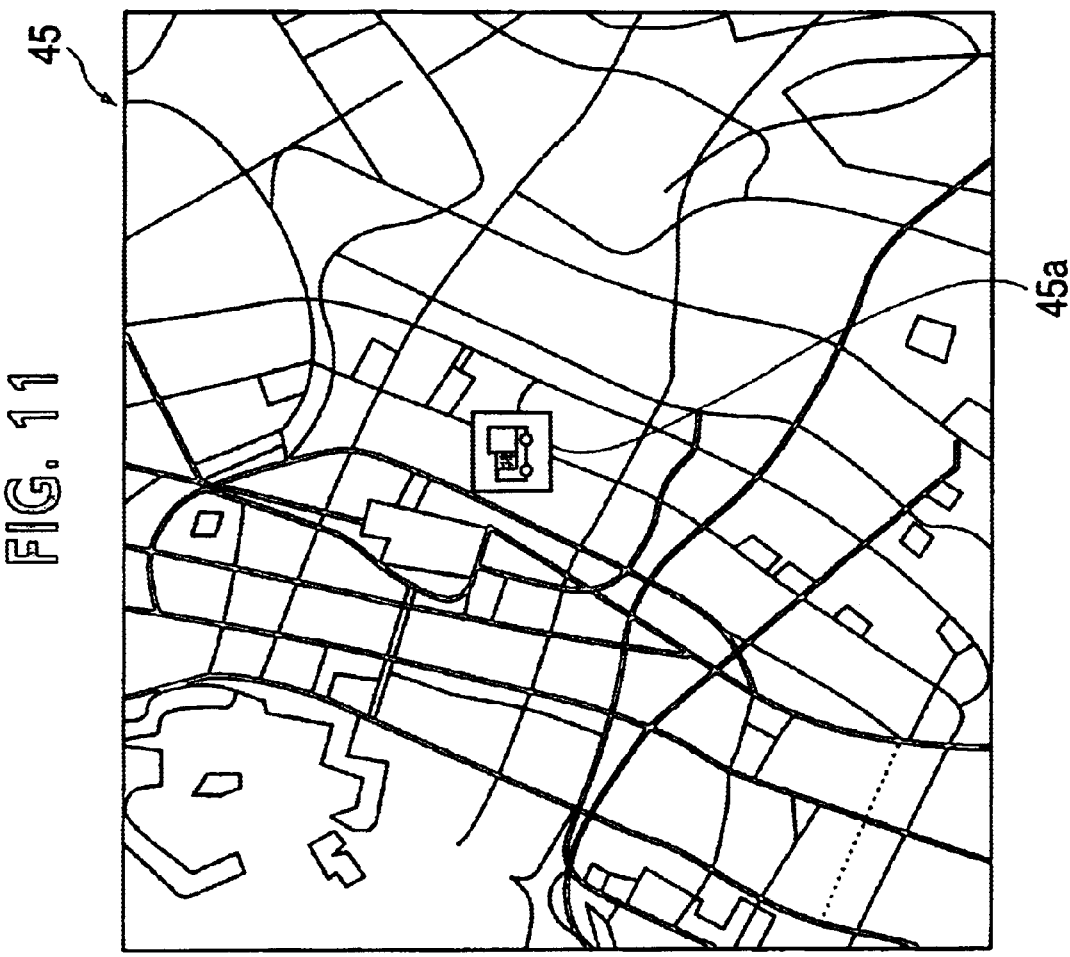
FIG. 11 is a diagram showing a map on which the position of the vehicle is marked.

Upon specifying "Location" in the optional items 46 and then "Record Trouble Place" which is not shown in the drawings, the location at which the vehicle in question is placed at that time can be registered by pointing the location on the map with a mouse or other input tools. FIG. 11 is an explanatory view showing the registered image (spot 45a in the drawing) of the place at which the vehicle is located on the map 45.

Similarly, the location of the customer's home can be registered with the geographical information means 12a by specifying the dialog "Customer Home Place". By further specifying "Distance to Home" in the screen image of FIG. 9, the distance from the place of the accident to the home of customer's own can be calculated. The distance between the two locations is calculated on the digital map.

Figure 12:
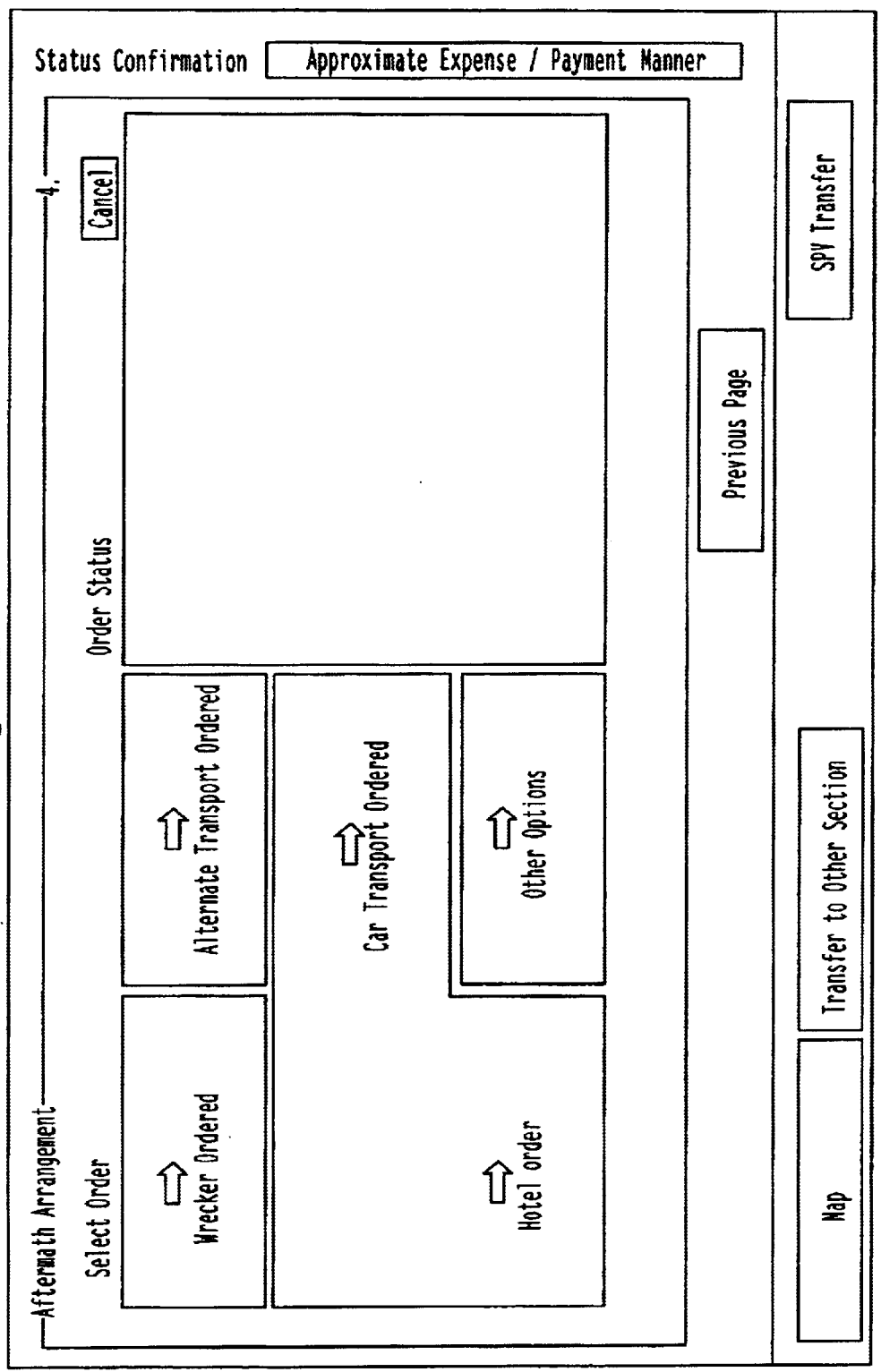
FIG. 12 is a diagram showing a screen image for confirming closure of a problem at the scene of the accident or trouble.

In the case that the input data filled in the dialogs "Self-movable", "Accident Place", "Road Service Member", "Occupant Number" and "Current Position" in the confirmation screen image shown in FIG. 9, the procedure guiding means 11 is operated to display another confirmation screen image for confirming whether or not the problem is settled, as shown in FIG. 12. At the request of the customer concerned, the operator provides the customer with an explanation as to the contents of "Wrecker Order", "Hotel Order", "Alternate Transport Order", and "Car Transport Order" contained in the dialog "Request Service" 50. A dialog "Other Guidance" is useful for the customer in the accident scene to obtain information around the accident scene.

Figure 13:
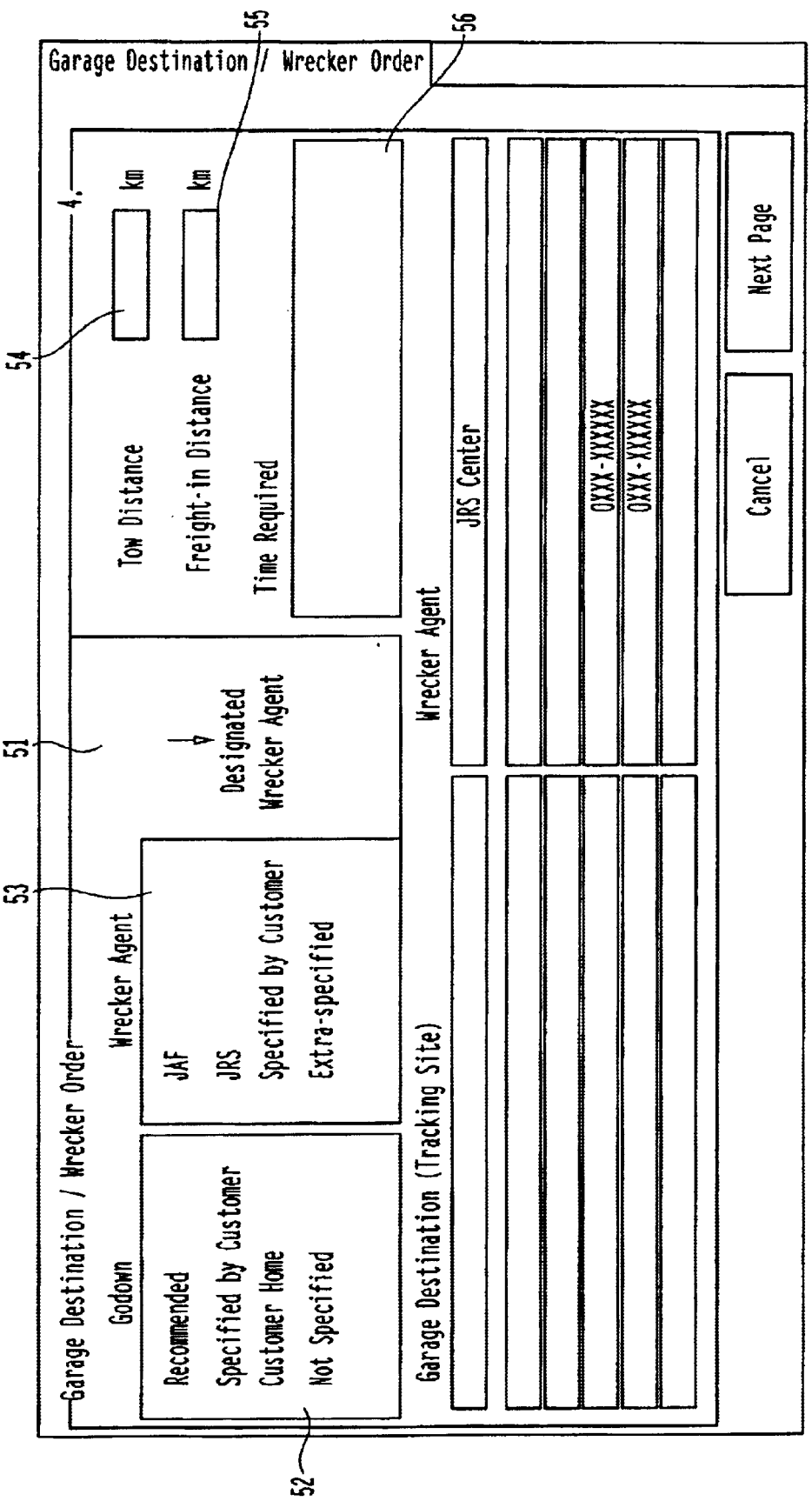
FIG. 13 is a diagram showing an information screen image for selecting a vehicle garage destination and a wrecker agent.
Figure 14:
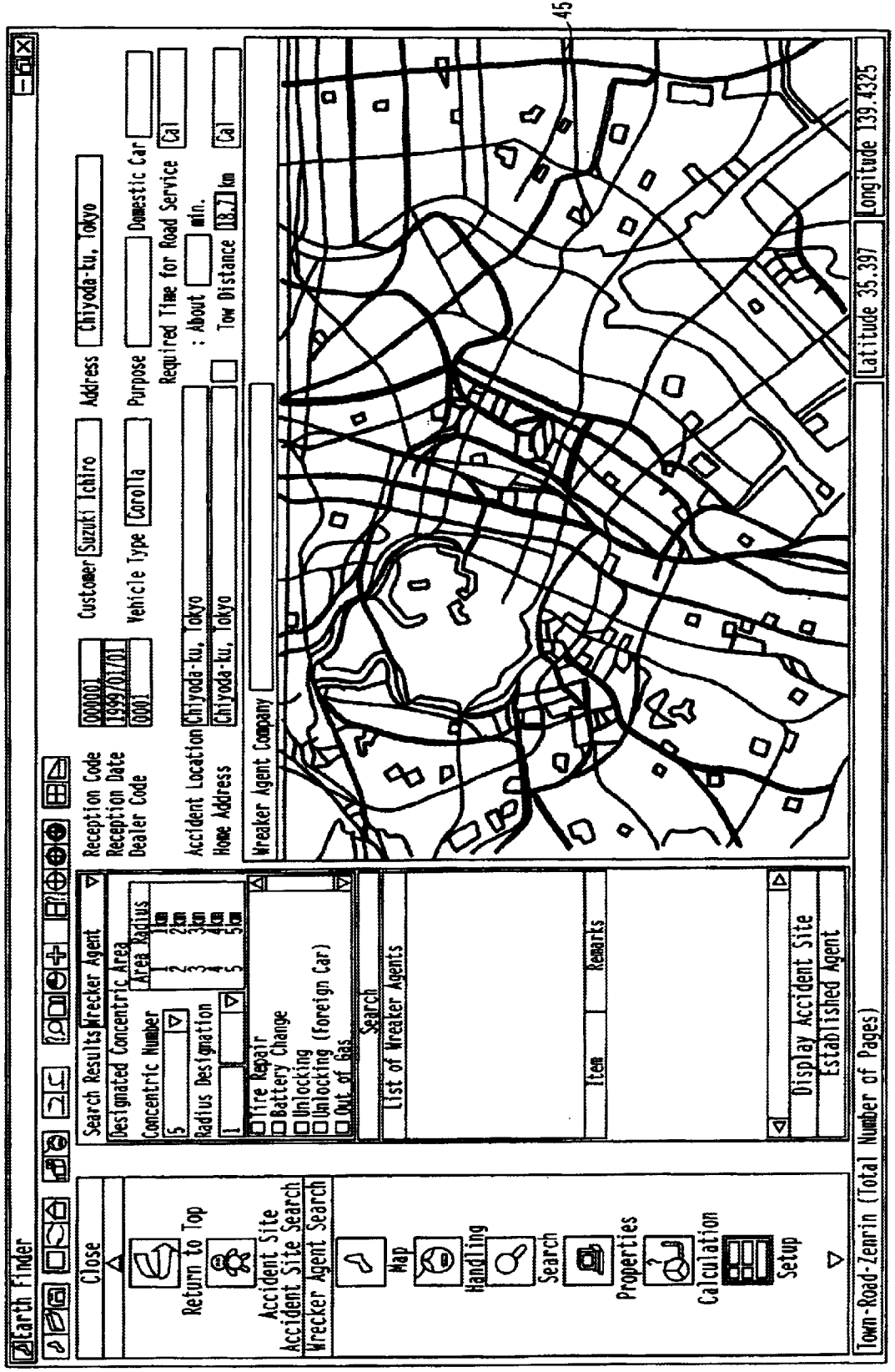
FIG. 14 is a diagram showing an information screen image for selecting a road service agent on the map.

When the dialog box "Wrecker Order" in the optional items 50 is checked, an information screen image for selecting a car garage destination and a wrecker agent is displayed as shown in FIG. 13.

When a wrecker agent selecting key 51 is specified, a recommended road service agent (wrecker agent for moving the disable car) and a garage destination, which are instituted previously, are selected.

In a case that data with respect to the garage destination and road service agent are manually inputted without specifying the wrecker agent selecting key 51 at the request of the customer, the relevant item is optionally selected from the optional items 52. The optional items 52 include "Recommended Destination", "Customer Request", "Customer's Home" and "No Appoint". In the optional items 53 for specifying the wrecker agent, selection of any road service agent from the prescribed agents may be made arbitrarily.

At this time, the road service agent may be specified on the map 45 with the geographical information means 12a. In the alternative, a road service agent may be selected from a list of road service agents in another service area.

At the same time, the distance from the "Current Place", meaning the accident location at which the disabled car is placed, to the "garage destination" is calculated with the geographical information means 12a and indicated in the dialog box "Tow Distance" 54 shown in FIG. 13.

Further, the geographical information means 12a has functions of searching the road service agent located nearest the accident location and calculating a freight-in distance from the specified road service agent to the accident location, which is indicated in the dialog box "Freight-in Distance" 55 and approximate time required for the road service agent to arrive at the accident location, which is indicated in the dialog box "Time Required" 56.

On the lower half of the display, the details of the garage destination and wrecker agent are displayed.

Simultaneously, an estimated amount for moving the disabled car by the wrecker agent is calculated by the statistical work means 14 and indicated on the display with the procedure guiding means 11 (not shown in the drawing).

Next, information about the arrangement at the garage destination is displayed with the procedure guiding means 11, as shown in FIG. 15. This information displayed on the screen contains the name of the road service agent specified, which is indicated in a window 60, and the phone number of the road service agent specified, which is indicated in a window 61. Therewithal, by clicking a selection button 62, the specified road service agent can be contacted by telephone. During the contact with the road service agent by telephone, the telephone line with the customer concerned is kept on. In the case that such a road service agent is elected by the customer or not specified, a message as shown in the drawing is displayed in the window 60 so as to call a discretionary phone number by operating a numeric keypad 63.

To carry on a tripartite conversation among the operator, customer and road service agent, a button "Hold Release" 64 is clicked.

The road service arrangement is completed by the foregoing procedures, and simultaneously calculating the total amount of charges for the service rendered for the consultation made this time by use of the procedure guiding means 11 and displaying the charges with the statistical work means 14.

FIG. 16 illustrates itemization of the charges rendered. As illustrated, the charge required for moving the disabled car is calculated. In a case of franchise insurance, the customer does not bear any expense ($0).

Figure 17:
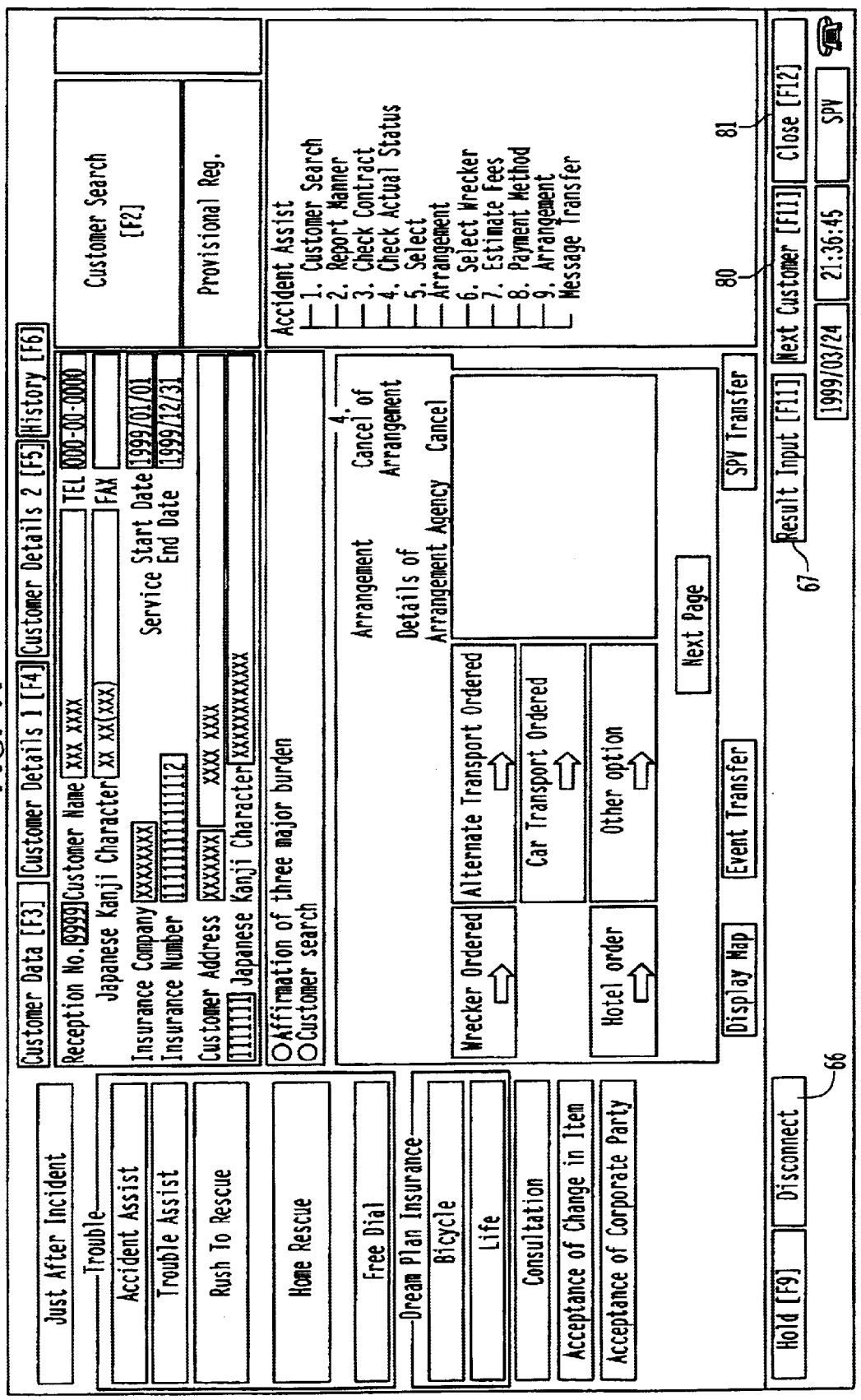
FIG. 17 is a diagram showing a screen image for confirming completion of the arrangement.

When all the procedures are completed, the main information screen image is displayed (shown in FIG. 17). When a button "Disconnect" 66 is selected, the telephone connection with the customer is broken.

Figure 18:
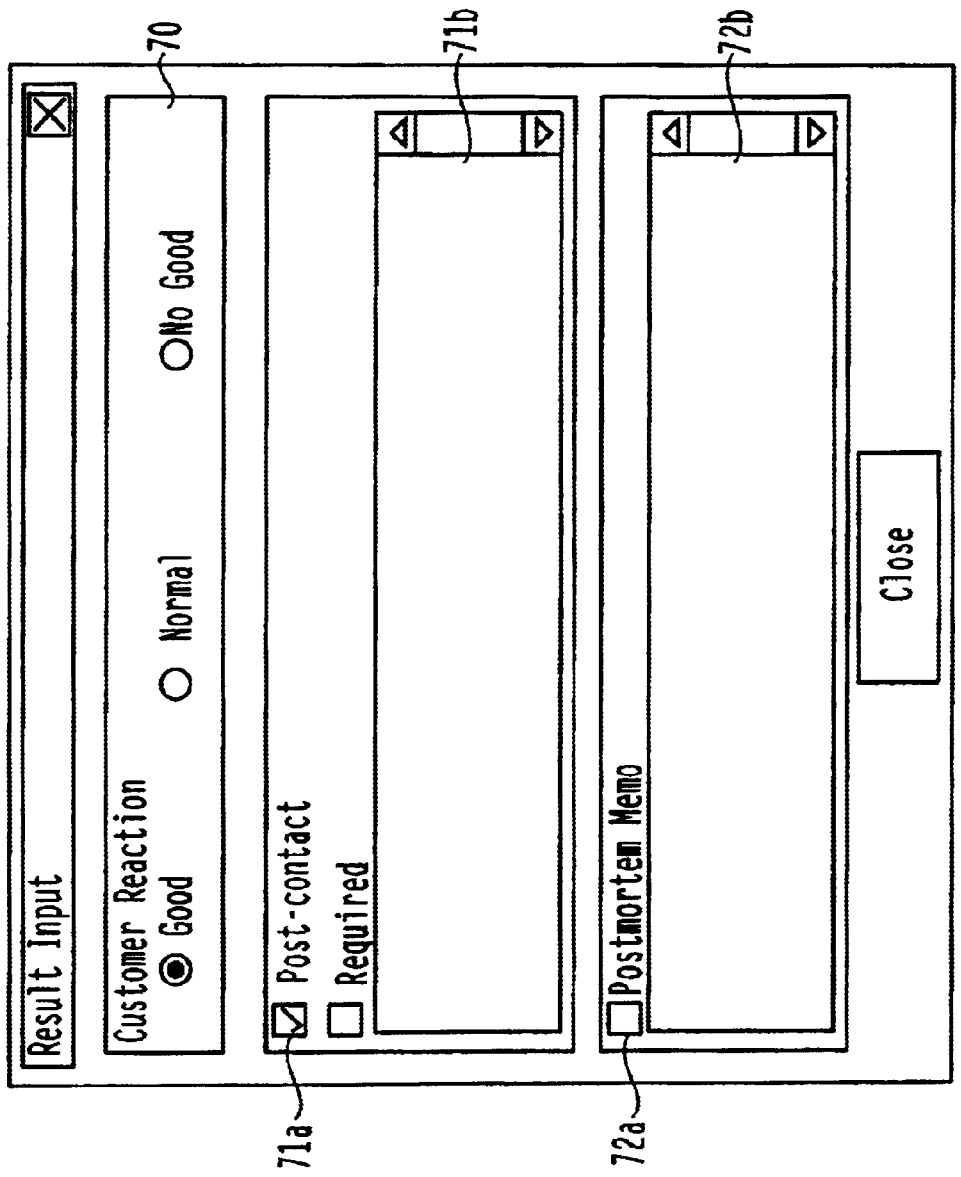
FIG. 18 is a diagram showing a screen image for keeping a record of the result of the consultation made at the time.

When selecting a dialog "Results" 67, a window for filling in the results of the event and the contents of the service which the operator provided for the customer is opened (see FIG. 18). In this result inputting window, the reaction of the customer can be checked in a dialog "Customer Reaction" 70. If any suggestions to the customer are required after working out a solution to the trouble, a check box "Required" 71a in a dialog "Post-contact" is checked, and then, necessary information may be filled in a window 71b. Also, notes for future benefit, if any, may be filled in a window 72a upon checking a check box "Postmortem Memo".

Thereafter, in a case of continuously awaiting further communication from another customer, a check box "Next Customer" 80 in FIG. 17 is checked to bring the system into its standby state. To conclude the consultation service, a check box "Close" 81 may be checked to quit the consultation business support system of the invention.

FIG. 19 shows a wrecker order sheet for arranging the wrecker service in the procedures for dealing with the car accident or trouble as described above. FIG. 20 shows a notice sheet for leaving a message to the customer contacting the consultation center. The data left in these forms are compiled with the statistical work means 14 in conjunction with the procedure guiding means 11. The contents entering the wrecker order sheet may be transmitted to the relevant wrecker agent through a communication line 5, or outputted to the printing means 4b so as to send a hard copy printed out from the printing means to the wrecker agent by mail.

With the statistical work means 14, a list of the affairs which were handled by the consultation business support system of the invention can be outputted to the output means 4, as shown in FIG. 21. The compiling process may be performed at prescribed intervals of time or as the occasion may demand.

In the meantime, the consultation business support system of the embodiment described above makes it possible to give a customer encountering an accident a practicable solution of the problems raised by the accident, but may also be applied for settling other problems suffered by various accidents such as a car breakdown or trouble, damages to a household, household goods and furniture, and livelihood, job-related damages, and other possible damages. Thus, the consulting service in various sorts of service categories can be dealt with in a similar manner to the foregoing procedures proposed by the consultation business support system of the invention.

FIG. 22 shows the aggregate tabulation representing the number of reception affairs to handle inquiries from the customers. Thus, the outcome of the affairs dealt with by the consultation center for the prescribed period of time is outputted to the output means 4 by a list as illustrated.

With the statistical work means 14, the data indicated on the aggregate tabulation are sorted by the customer's information, road service agent, garage destination and settlement of accounts in a logistics table sheet as shown in FIG. 23. Then, the aggregate tabulation can be outputted to the output means 4.

Industrial Applicability

As is apparent from the foregoing description, according to the present invention, the advisory information about appropriate measures for coping with the problems posed by the customer or another person can be timely provided for the customer concerned by sequentially selecting the prescribed optional items in conformity to the contents of inquiries from the customer, so that the desired consultation service for resolving the problems can be swiftly and effectively fulfilled.

Furthermore, the statistical procedure of compiling the contents of inquiries from the customers enables the personal data of the customers contacting the consultation center to be utilized after-the-fact, thus to prosecute the consultation service efficiently.

Besides, the system for coping with a vehicular accident or trouble according to the invention makes it possible to quickly give the required advisory information for dealing with the accident or trouble to the customer concerned and perform the necessary procedures for rapidly selecting a road service agent, a garage destination and other options, so that even a disabled car on the road can be moved promptly to the selected garage destination or other optional place.

Moreover, immediate and practical consultation service can be provided by making use of a digital map to search the locations of the vehicle in the accident and the garage destination to which the vehicle must be moved.

What is claimed is:

1. A consultation business support system for providing advisory information in conformity with an inquiry from a customer, said consultation business support system comprising:

input means for inputting data and commands of optional information items in accordance with the inquiry from the customer;

processing means including procedure guiding means for displaying the optional information items based on the data inputted with said input means and a guiding procedure to be provided to the customer when one item of the optional information items is selected to sequentially provide the advisory information to the customer, and statistical work means for performing statistical processing of the selected one item of the optional information items based on results obtained by said procedure guiding means; and output means including a display for displaying the optional information items and the guiding procedure.

2. A consultation business support system for providing advisory information in conformity with an inquiry as to a vehicular accident, trouble or other problems from a previously registered customer, said consultation business support system comprising:

input means for inputting data and commands for optional information items in accordance with the inquiry from the customer connected to said consultation business support system;

a memory unit storing a customer database;

processing means including customer searching means for searching for data of the connected customer from said customer database stored in said memory unit in accordance with the inquiry of the connected customer, procedure guiding means for sequentially displaying a guiding procedure to be provided to the connected customer in accordance with the inquiry from the connected customer, and positioning means for geographically identifying a position of the connected customer; and output means including a display for displaying data and information.

3. A consultation business support system according to claim 2, wherein said positioning means detects a current position of the connected customer at a disabled vehicle, researches and connects to one of a garage destination and a road service agent to which the disabled vehicle will be transported, and calculates a path from the current position of the disabled vehicle to the one of the garage destination and the road service agent based on geographical information of a digital map.

4. A consultation business support system according to claim 3, wherein said positioning means maintains a connection to the one of the garage destination and the road service agent via a communication line while the guiding procedure is given to the connected customer.

5. A consultation business support system according to claim 2, further comprising statistical work means for performing statistical processing of a selected information item corresponding to the guiding procedure based on results obtained by said procedure guiding means.

6. A consultation business support system according to claim 3, wherein the guiding procedure is displayed on said display while said positioning means is connecting to the one of the garage destination and the road service agent.

7. A consultation business support system according to claim 6, further comprising statistical work means for performing statistical processing of a selected information item corresponding to the guiding procedure based on results obtained by said procedure guiding means.

8. A consultation business support system according to claim 4, wherein the communication line is a telephone line.

9. A consultation business support system for providing advisory information in conformity with an inquiry from a customer, said consultation business support system comprising:

an input device operable to have input data and commands for optional information items entered thereby in accordance with the inquiry from the customer connected to said consultation business support system;

a display; and a processor operable to display the optional information items based on the data inputted with said input device and a guiding procedure to an operator to be provided to the customer when one item of the optional information items is selected to sequentially provide the advisory information to the customer on said display, and operable to perform statistical processing of the selected one item of the optional information items.

10. A consultation business support system for providing advisory information in conformity with an inquiry as to a vehicular accident, trouble or other problems from a previously registered customer, said consultation business support system comprising:

an input device operable to input data and commands for optional information items thereby in accordance with the inquiry from the customer connected to said consultation business support system;

a memory unit storing a customer database;

a display; and a processor operable to search for data of the connected customer from said customer database stored in said memory unit in accordance with the inquiry of the connected customer, sequentially display a guiding procedure to an operator to be provided to the connected customer in accordance with the inquiry from the connected customer on said display, and geographically identify a position of the connected customer.

11. A consultation business support system according to claim 10, wherein said processor detects a current position of the connected customer at a disabled vehicle, researches and connects to one of a garage destination and a road service agent to which the disabled vehicle will be transported, and calculates a path from the current position of the disabled vehicle to the one of the garage destination and the road service agent based on geographical information of a digital map.

12. A consultation business support system according to claim 11, further comprising a geographical database in which the geographical information is stored.

13. A consultation business support system according to claim 11, wherein said processor maintains a connection to the one of the garage destination and the road service agent via a communication line while the guiding procedure is given to the connected customer.

14. A consultation business support system according to claim 10, wherein said processor is further operable to perform statistical processing of a selected information item corresponding to the guiding procedure.

15. A consultation business support system according to claim 13, wherein the communication line is a telephone line.

* * * * *